W. ANDREWS.
Gridiron.
No. 75,107. Patented March 3, 1868.
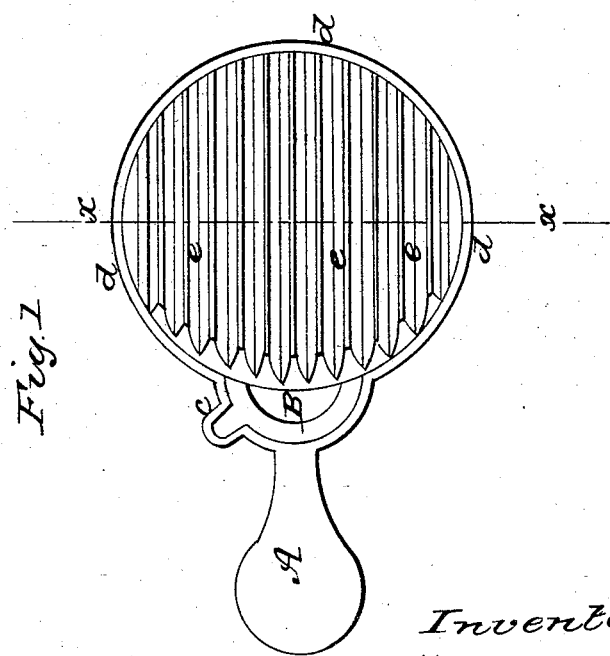

United States Patent Office

WILLIAM ANDREWS, OF ALLEGHANY COUNTY, MARYLAND.

Letters Patent No. 75,107, dated March 3, 1868.

IMPROVEMENT IN GRIDIRONS.

The Schedule referred to in these Letters Patent and making part of the same.

TO ALL WHOM IT MAY CONCERN:

Be it known that I, WILLIAM ANDREWS, a citizen of Alleghany county, and State of Maryland, have invented a new and improved Gridiron and Frying-Pan Combined, for the purpose of frying or broiling meats; and I do hereby declare the following is a full and exact description thereof, reference being had to the accompanying drawings, and to the letters of reference marked thereon.

To enable others skilled in the art to make and use my invention, I will proceed to describe its construction and operation.

Figure I is a top view of my gridiron, and

Figure II is a section on the line $x\ x$.

The entire utensil is moulded in one piece. A is the handle; B is a small basin for catching the gravy; C is a lip or mouth-piece for pouring out the gravy; $d\ d\ d$ is the side or rim, which, on the upper side or face, is made flush with the bars $e\ e\ e$, and extending a little below the bars, on the under side or bottom. The bars $e\ e\ e$ are united their whole length, and forming between each a gutter, for conducting the gravy along the imperforated bottom into the basin B.

This combined gridiron and frying-pan may be used for either broiling or frying, and answers equally well for either, as the rim $d\ d\ d$ makes the utensil a frying-pan, while the bars or ribs constitute it a gridiron.

I am aware that devices of a similar kind, with corrugated bottoms, have been made, and do not broadly claim a device of this kind.

What I claim as my invention, and desire to secure by Letters Patent, are—

Bars $e\ e\ e$, united as described, and forming an imperforated bottom, in combination with the rim $d$, the basin B, and the mouth C, constructed substantially as and for the purpose set forth.

WM. ANDREWS

Witnesses:
 LEVI SHAW,
 G. B. McLAUGHLIN.